US007403877B2

(12) United States Patent
Aragones et al.

(10) Patent No.: US 7,403,877 B2
(45) Date of Patent: *Jul. 22, 2008

(54) SYSTEM, METHOD AND COMPUTER PRODUCT FOR BASELINE MODELING A PRODUCT OR PROCESS

(75) Inventors: James Kenneth Aragones, Clifton Park, NY (US); Jeffrey William Stein, Albuquerque, NM (US); Jeremiah Francis Donoghue, Ballston Lake, NY (US); Ronald George Maruscik, Lebanon, OH (US)

(73) Assignee: General Electric Company, Niskayuna, NY (US)

( * ) Notice: Subject to any disclaimer, the term of this patent is extended or adjusted under 35 U.S.C. 154(b) by 1364 days.

This patent is subject to a terminal disclaimer.

(21) Appl. No.: 09/682,314

(22) Filed: Aug. 17, 2001

(65) Prior Publication Data

US 2003/0036891 A1 Feb. 20, 2003

(51) Int. Cl.
*G06F 7/60* (2006.01)
*G06F 17/10* (2006.01)
*G06F 19/00* (2006.01)
*G06F 7/70* (2006.01)

(52) U.S. Cl. .................. 703/2; 703/8; 701/14
(58) Field of Classification Search ............ 703/8, 703/7, 2, 1; 707/102; 701/14
See application file for complete search history.

(56) References Cited

U.S. PATENT DOCUMENTS

| 4,215,412 | A |   | 7/1980  | Bernier et al. |         |
|-----------|---|---|---------|----------------|---------|
| 5,018,069 | A | * | 5/1991  | Pettigrew      | 701/35  |
| 5,050,081 | A |   | 9/1991  | Abbott et al.  |         |
| 5,075,881 | A |   | 12/1991 | Blomberg et al.|         |
| 5,080,458 | A | * | 1/1992  | Hockaday       | 385/14  |
| 5,189,606 | A |   | 2/1993  | Burns et al.   |         |
| 5,197,127 | A | * | 3/1993  | Waclawsky et al.| 709/224|
| 5,408,412 | A | * | 4/1995  | Hogg et al.    | 701/33  |
| 5,687,082 | A |   | 11/1997 | Rizzoni        |         |
| 5,703,283 | A |   | 12/1997 | McClish et al. |         |
| 5,727,128 | A | * | 3/1998  | Morrison       | 706/45  |
| 6,003,808 | A | * | 12/1999 | Nguyen et al.  | 244/1 R |
| 6,047,593 | A |   | 4/2000  | Scher et al.   |         |
| 6,067,486 | A | * | 5/2000  | Aragones et al.| 701/29  |
| 6,125,312 | A | * | 9/2000  | Nguyen et al.  | 701/35  |

(Continued)

FOREIGN PATENT DOCUMENTS

EP          1160712           5/2001

(Continued)

OTHER PUBLICATIONS

Bill Curtis, Marc Kellner, Jim Over "Process Modeling", ACM 1992, pp. 75-90.*

(Continued)

*Primary Examiner*—Zoila E. Cabrera
*Assistant Examiner*—Dwin M Craig
(74) *Attorney, Agent, or Firm*—Penny A. Clarke

(57) ABSTRACT

System, method and computer product for baseline modeling a product or process. A service database contains process data. A preprocessor processes the data into a predetermined format. A baseline modeling component builds a baseline model from the preprocessed data, wherein the baseline model relates process performance variables as a function of process operating conditions.

54 Claims, 4 Drawing Sheets

U.S. PATENT DOCUMENTS

| | | | | |
|---|---|---|---|---|
| 6,151,582 | A | 11/2000 | Huang et al. | |
| 6,216,066 | B1* | 4/2001 | Goebel et al. | 701/29 |
| 6,223,143 | B1* | 4/2001 | Weinstock et al. | 703/17 |
| 6,243,696 | B1* | 6/2001 | Keeler et al. | 706/21 |
| 6,317,654 | B1 | 11/2001 | Gleeson et al. | |
| 6,408,259 | B1* | 6/2002 | Goebel et al. | 702/183 |
| 6,473,677 | B1 | 10/2002 | Hershey et al. | |
| 6,487,479 | B1* | 11/2002 | Nelson | 701/29 |
| 6,487,490 | B1 | 11/2002 | Kamath et al. | |
| 6,519,575 | B1* | 2/2003 | Goebel | 706/20 |
| 6,591,182 | B1 | 7/2003 | Cece et al. | |
| 6,601,015 | B1 | 7/2003 | Milvert et al. | |
| 6,606,580 | B1 | 8/2003 | Zedda et al. | |
| 6,631,384 | B1 | 10/2003 | Richman et al. | |
| 6,799,154 | B1* | 9/2004 | Aragones et al. | 703/22 |
| 6,832,205 | B1* | 12/2004 | Aragones et al. | 705/10 |
| 7,031,878 | B2 | 4/2006 | Cuddihy et al. | |
| 7,039,554 | B2 | 5/2006 | Nguyen et al. | |
| 2001/0032109 | A1 | 10/2001 | Gonyea et al. | |
| 2002/0173897 | A1 | 11/2002 | Leamy et al. | |
| 2003/0034995 | A1 | 2/2003 | Osborn et al. | |
| 2003/0045992 | A1 | 3/2003 | Humerickhouse et al. | |
| 2004/0172227 | A1* | 9/2004 | Aragones | 703/8 |
| 2004/0172228 | A1* | 9/2004 | Aragones | 703/8 |
| 2004/0172229 | A1 | 9/2004 | Aragones et al. | |

FOREIGN PATENT DOCUMENTS

| | | |
|---|---|---|
| EP | 1146468 | 10/2001 |

OTHER PUBLICATIONS

Marc A. Schuldt, Jeffery S. Romberger, "Alternative Approaches to Baseline Estimation Using Calibrated Simulations" ASHRAE Transactions, 1998, pp. 871-879.*

Richard A. Johnson, et al, "Multivariate Linear Regression Models", Applied Multivariate Statistical Analysis, 2nd Edition, Chapter 7, pp. 273-339., 1988.

* cited by examiner

SYSTEM, METHOD AND COMPUTER PRODUCT FOR BASELINE MODELING A PRODUCT OR PROCESS

BACKGROUND OF THE INVENTION

This disclosure relates generally to improving the quality and productivity of a product or process and more particularly to baseline modeling of a product or process.

Baseline modeling of a product or process generally provides an understanding of the performance of an "ideal" product or process over time. An engine is one type of product or process that baseline modeling is suitable for use. Engine baseline modeling has a multitude of uses including, but not limited to, determining when an engine performs out of specification, predicting when an engine failure will occur, detecting abnormal conditions, determining the quality of an engine and designing new engines. Typically, engine baseline models are developed from data gathered from thermodynamic cycle analyses and simulation. First, models of ideal values are created, indexed by variables such as altitude, temperature, power setting, and air speed. Once data from the normal operation of the engine is available, these models are updated by analyzing data corresponding to a particular model characteristic. An engineer then looks for data that are similar for the specified engine variables (e.g., altitude, temperature, power setting, air speed), groups the similar data, averages them for each variable and performs other operations as desired. The engineer then plots data for each of the variables. The plots provide interrelationship information between each of the engine variables, which the engineer uses to create tables of typical operation parameters the baseline model. These tables of parameters are used as the basis of comparison for engine operation. Differences from the baseline model may indicate engine faults or deterioration trends.

There are several problems associated with this type of engine baseline modeling. First, this type of engine baseline modeling is very labor intensive because the engineer has to review the data, find data that are similar, group and average the data, perform other desired operations on the data, plot the data and create tables. Another problem is that one engineer cannot readily reproduce an engine baseline model developed by another engineer because this process is very individualized. It is helpful if one engineer can reproduce the engine baseline model generated by another engineer to validate quality of the baseline. Another problem associated with this type of engine baseline model is that the resulting model does not provide a good "picture" of an engine operating outside normal conditions. Furthermore, this type of engine baseline modeling does not provide a measure of how good the developed model is.

In order to overcome the above problems, there is a need for an automated approach to engine baseline modeling that standardizes the process to improve reliability by minimizing human interventions.

SUMMARY OF INVENTION

In one aspect of this disclosure, there is a system, method and computer readable medium that stores instructions for instructing a computer system, to perform engine baseline modeling. In this embodiment, an engine service database contains engine data. A preprocessor processes the engine data into a predetermined format. An engine baseline modeling component builds an engine baseline model from the preprocessed data, wherein the engine baseline model relates engine performance variables as a function of engine operating conditions.

In a second aspect of this disclosure, there is a system, method and computer readable medium that stores instructions for instructing a computer system, to perform engine baseline modeling. In this embodiment, an engine service database contains engine data. A preprocessor processes the engine data into a predetermined format. An engine baseline modeling component builds an engine baseline model from the preprocessed data using a regression analysis. The regression analysis relates engine performance variables as a function of engine operating conditions. A model diagnostics component evaluates the performance of the of the engine baseline model.

In a third aspect of this disclosure, there is a system, method and computer readable medium that stores instructions for instructing a computer system, to perform engine baseline modeling of an aircraft engine. In this embodiment, an engine service database contains aircraft engine data. A preprocessor processes the aircraft engine data into a predetermined format. In particular, the preprocessor corrects the aircraft engine data to standard conditions derived for an aircraft engine. An engine baseline modeling component builds an engine baseline model from the preprocessed data using a regression analysis. In particular, the regression analysis relates engine performance variables as a function of engine operating conditions. A model diagnostics component evaluates the performance of the of the engine baseline model.

In a fourth aspect of this disclosure, there is a system, method and computer readable medium that stores instructions for instructing a computer system, to perform engine baseline modeling of an aircraft engine. In this embodiment, an engine service database contains aircraft engine data. A preprocessor processes the aircraft engine data into a predetermined format. In particular, the preprocessor corrects the aircraft engine data to standard conditions derived for an aircraft engine. An engine baseline modeling component builds an engine baseline model from the preprocessed data using a regression analysis. In particular, the regression analysis relates engine performance variables as a function of engine operating conditions. The engine baseline modeling component also comprises a metric component to validate the engine baseline model. A model diagnostics component evaluates the performance of the of the engine baseline model.

In a fifth aspect of this disclosure, there is method and computer readable medium that stores instructions for instructing a computer system, to perform engine baseline modeling of an engine. In this embodiment, a user is presented with aircraft engine data. The user is prompted to select engine performance variables and engine operating conditions from the aircraft engine data to model. In response to the user selection, the engine data is preprocessed into a predetermined format. A regression is used to build an engine baseline model from the preprocessed data.

In a sixth aspect of this disclosure, there is a system, method and computer readable medium that stores instructions for instructing a computer system, to perform baseline modeling of a process. In this embodiment, a service database contains process data. A preprocessor processes the data into a predetermined format. A baseline modeling component builds a baseline model from the preprocessed data, wherein the baseline model relates process performance variables as a function of process operating conditions.

DETAILED DESCRIPTION

Figure 1:
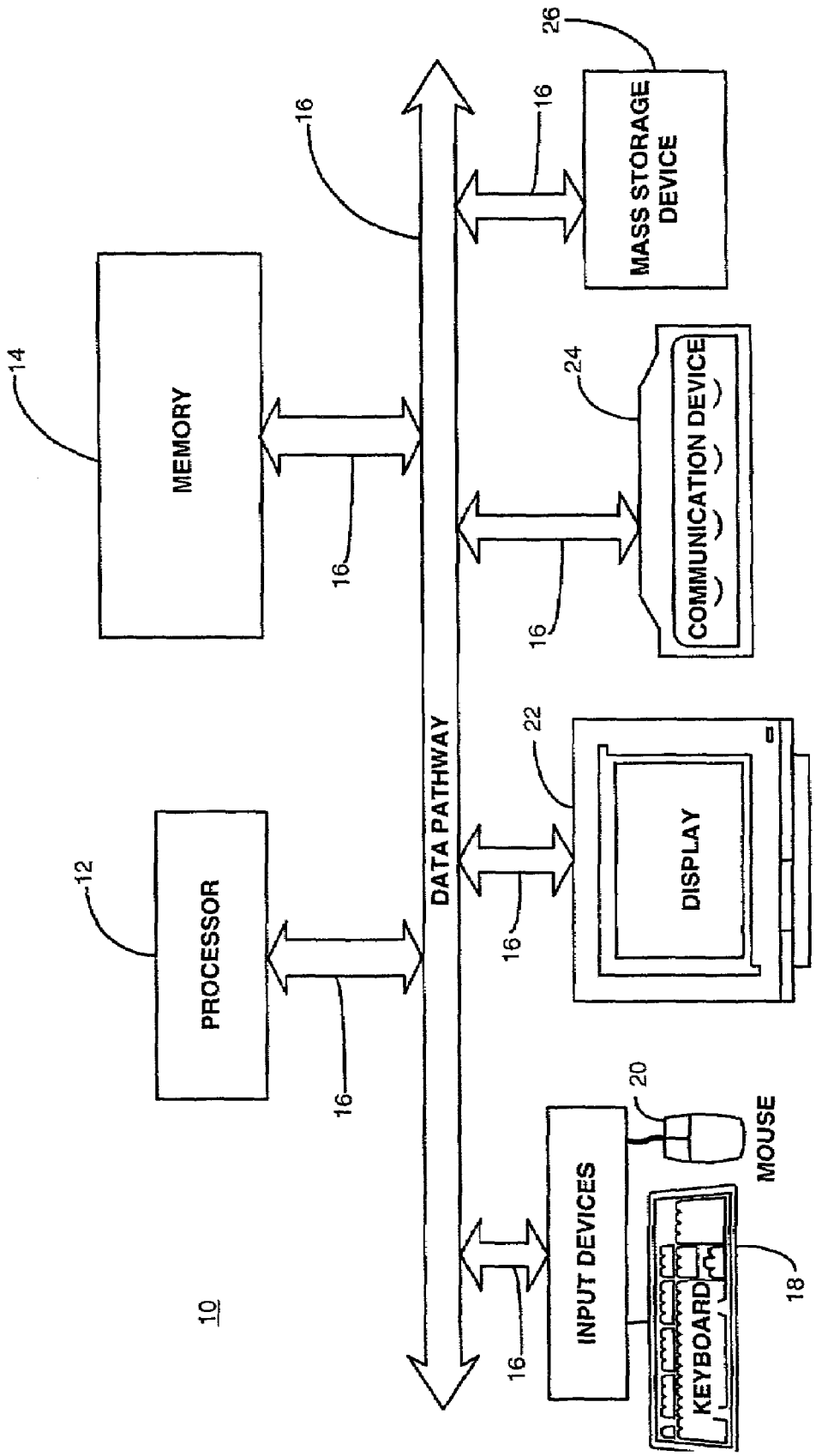
FIG. 1 shows a schematic diagram of a general-purpose computer system in which a system for performing engine baseline modeling operates.

This disclosure describes a system, method and computer product for baseline modeling of a product or process such as an aircraft engine, however, the disclosure is applicable to any type of product or process where it is desirable to model performance. FIG. 1 shows a schematic diagram of a general-purpose computer system in which a system for performing engine baseline modeling operates. The computer system 10 generally comprises a processor 12, memory 14, input/output devices, and data pathways (e.g., buses) 16 connecting the processor, memory and input/output devices. The processor 12 accepts instructions and data from memory 14 and performs various operations. The processor 12 includes an arithmetic logic unit (ALU) that performs arithmetic and logical operations and a control unit that extracts instructions from memory 14 and decodes and executes them, calling on the ALU when necessary. The memory 14 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). Also, memory 14 preferably contains an operating system, which executes on the processor 12. The operating system performs basic tasks that include recognizing input, sending output to output devices, keeping track of files and directories and controlling various peripheral devices.

The input/output devices may comprise a keyboard 18 and a mouse 20 that enter data and instructions into the computer system 10. Also, a display 22 may be used to allow a user to see what the computer has accomplished. Other output devices may include a printer, plotter, synthesizer and speakers. A communication device 24 such as a telephone or cable modem or a network card such as an Ethernet adapter, local area network (LAN) adapter, integrated services digital network (ISDN) adapter, Digital Subscriber Line (DSL) adapter or wireless access card, enables the computer system 10 to access other computers and resources on a network such as a LAN, wireless LAN or wide area network (WAN). A mass storage device 26 may be used to allow the computer system 10 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computer system 10 can take the form of a hand-held digital computer, personal digital assistant computer, notebook computer, personal computer, workstation, mini-computer, mainframe computer or supercomputer.

Figure 2:
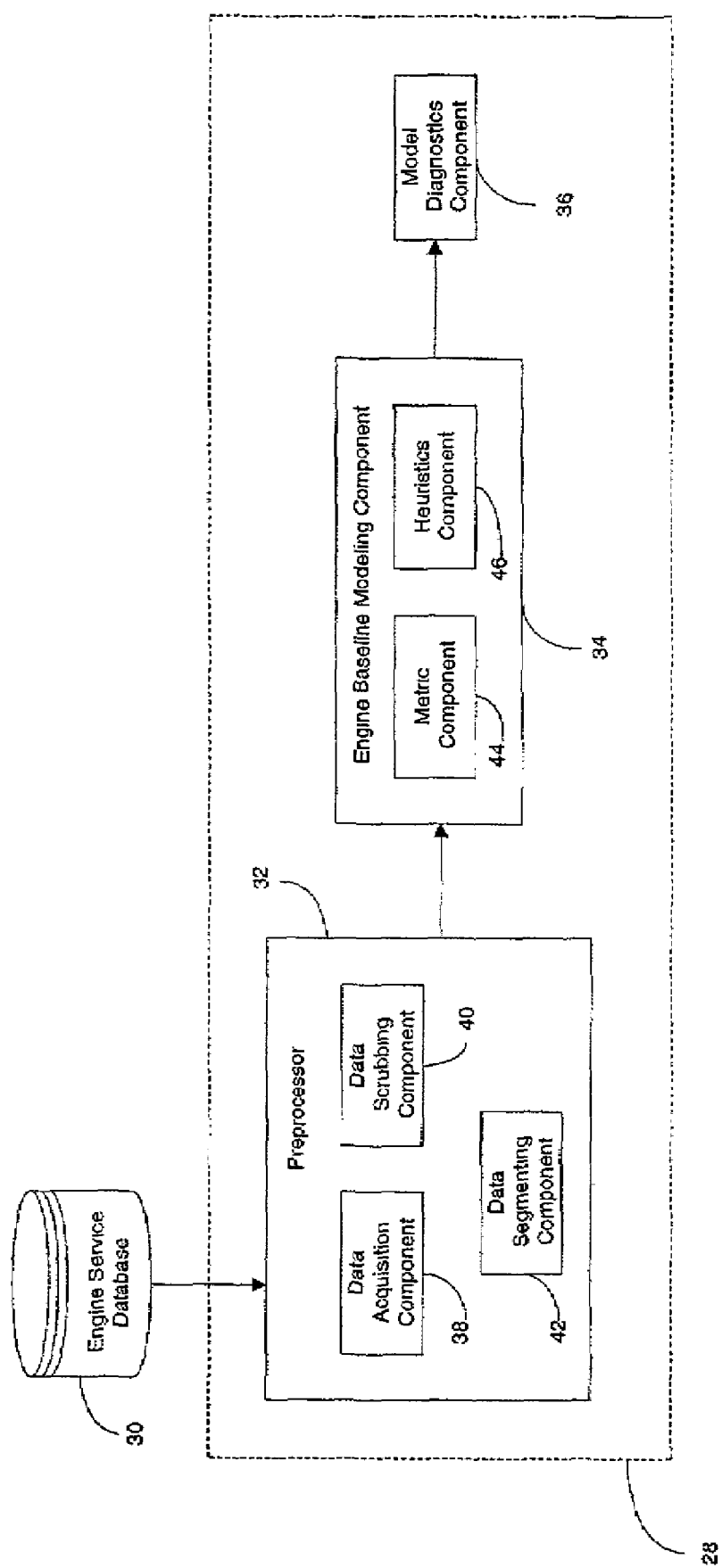
FIG. 2 shows a top-level component architecture diagram of the engine baseline modeling system that operates on the computer system shown in FIG. 1.

FIG. 2 shows a top-level component architecture diagram of an engine baseline modeling system 28 that operates on the computer system 10 shown in FIG. 1. Generally, the engine baseline modeling system 28 models the performance of an "ideal" engine for a specified type aircraft engine. An engine baseline model built with the engine baseline modeling system 28 has a multitude of uses. An illustrative, but non-exhaustive list of potential uses for an engine baseline model built from the engine baseline modeling system 28 includes monitoring engine status, predicting future engine behavior, diagnosing engine faults, determining when an engine performs out of specification, determining the quality of an engine and designing new systems for an engine.

In FIG. 2, there is an engine service database 30 that contains engine data for a variety of aircraft engines. The engine data comprises an assortment of engine performance information for each of the engines. Generally, engine performance information includes environmental data in which the engines operate such as altitude, air temperature, air speed, engine loading, engine temperature and pressure. One of ordinary skill in the art will recognize that the engine service database 30 may comprises other engine performance information such as mach, fan speed, etc. In addition, the engine service database 30 may comprise other data such as operational data. A non-exhaustive list of engine operational data stored in the engine service database 30 includes exhaust gas temperatures (EGT), shaft speed between compressors and turbines (N1 and N2), pressure combustion ($P_C$) and fuel flow (WF). One of ordinary skill in the art will recognize that other engine operational data may include engine bleed settings, vibration readings, and control mechanism settings. Also, the engine service database 30 may comprise other data such as aircraft operating and settings data (e.g., bleed settings).

One of ordinary skill in the art will recognize that there are a variety of approaches to acquiring the above data and storing them in the engine service database 30. For example, some data can be captured automatically using on-line data acquisition techniques, while other data can be captured using manually recording techniques or on-board data capture techniques. Furthermore, the engine service database 30 preferably stores the data in a format that permits users to import the data into other tools for further analysis, such as Microsoft EXCEL, Minitab, and SAS.

The engine service database 30 may comprise other types of data for the engines. For example, the engine service database 30 may comprise service information for the engines. Generally, the service information will comprise information such as engine product information, age information of the engines and repair history of the engines (e.g., dates of service events, types of service events, etc.). Other types of engine data stored in the engine service database 30 may include in-flight data, engine utilization data (e.g., where, when, how flown), ownership data, remote monitoring and diagnostics status data.

Referring to FIG. 2, the engine baseline modeling system 28 comprises a preprocessor 32 that processes the engine data into a predetermined format. In particular, the preprocessor 32 comprises a data acquisition component 38 that extracts the engine data from the engine service database 30. The data acquisition component 38 acquires the service data by using commercially available modules available from Minitab, Microsoft, Oracle, etc, which directly extract the data into the engine baseline modeling system 28, however, one of ordinary skill in the art will recognize that one can write specialized code to extract the data into a common format and write additional specialized code to import that into the system.

The preprocessor 32 performs computations that simplify future processing of the data, while a data scrubbing component 40 cleans the engine data. In particular, the preprocessor 32 performs operations that convert the data into standard units. For example, the preprocessor 32 can convert temperature data from Celsius to Kelvin or correct engine power setting data by the engine bleed settings. Other types of corrections that the preprocessor 32 may perform include converting pounds to kilograms, altitude to pressure, knots and altitude to mach number. One of ordinary skill in the art will recognize that the listed corrections are only illustrative of some possibilities and are not exhaustive of other possibilities. Furthermore, one of ordinary skill in the art will recognize that the preprocessor 32 can perform the corrections in any manner desired (e.g., Celsius to Rankine) and is not limited to the above order. Examples of cleaning operations performed by the data scrubbing component 40 include discarding data elements with missing values, correcting simple typographical errors, discarding data elements with erroneous values out of reasonable operating range, etc. One of ordinary skill in the art will recognize that the listed cleaning operations are only illustrative of some possibilities and are not exhaustive of other possibilities.

In addition, the preprocessor also comprises a data segmenting component 42 that segments engine data into groups, nodes or clusters that represent similar operating conditions. The groups generally include engine performance variables such as power setting, altitude, air speed (mach number), and air temperature. One of ordinary skill in the art will recognize that other engine performance variables such as air humidity and control settings may be selected and that the disclosure should not be limited to these variables. Once the groups have been selected, then the data segmenting component 42 can segment the data into the particular group that it relates to. Once the data are segmented into the groups, then the data segmenting component 42 can use a cluster analysis to determine clusters of operating conditions. Alternatively, an engineer may assign bands of operations of interest for each of the variables.

An engine baseline modeling component 34 builds an engine baseline model from the data processed by the preprocessor 32. In particular, the engine baseline model built by the engine baseline modeling component relates the selected performance variables as a function of engine operating conditions using the processed data. Engine operating conditions include engine, aircraft and environmental conditions. In this disclosure, the engine baseline model is built from a regression analysis. Generally, a regression is the statistical science of determining an equation from a finite number of points that provides values of Y for a given X, i.e., Y=f(X). In this disclosure, the equation to be determined can be expressed as:

$$Y=f(\text{altitude}, \text{temperature}, \text{power setting}, \text{air speed}) \quad (1)$$

where altitude, temperature, power setting and air speed are the X variables. The engine baseline modeling component 34 performs a regression to determine the above equation for each of the selected engine performance variables (i.e., power setting, altitude, air speed, and air temperature) during specified times that the engine is operating. For instance, the engine modeling component 34 can perform the regression on the data taken during the take-off, climb and cruise for any or all of the engine performance variables. One of ordinary skill in the art will recognize that more engine performance variables (air humidity, control settings, etc.) or less engine performance variables can be used in equation 1. In addition, one of ordinary skill in the art will recognize that different combinations of engine performance variables can be used in equation 1.

In general, a regression fits a parametric equation to a set of data by solving for values of regression parameters such that the best fit to the data set is obtained. Multiple linear regression is a type of regression that solves the system of equations, minimizing the combined error. In this disclosure, the system of equations that the regression solves can be as follows:

$$y[1]=a^*\text{power setting}[1]=b^*\text{altitude}[1]$$
$$=c^*\text{temperature}[1]=d^*\text{airspeed}[1]=\ldots=\text{error}[1]$$

$$y[2]=a^*\text{power setting}[2]=b^*\text{altitude}[2]$$
$$=c^*\text{temperature}[2]=d^*\text{airspeed}[2]=\ldots=\text{error}[2]$$

$$\ldots$$

$$y[n]=a^*\text{power setting}[n]=b^*\text{altitude}[n]$$
$$]=c^*\text{temperature}[n]=d^*\text{airspeed}[n]=\ldots=\text{error}[n] \quad (2)$$

wherein a, b, c, d are the regression parameters and power setting[1], altitude[1], temperature[1], airspeed[1], y[1]] are observed events. Again, one of ordinary skill in the art will recognize that the system of equations can differ depending on the selection of engine performance variables.

The resulting parameter estimates for a, b, c, d are representative of the new baseline model. Instead of using tables to develop the baseline model as was done in the past, there is now a simple equation that describes the baseline behavior of the engine, from which either the tables may be generated, or the equation can be applied directly. For example, a baseline model for exhaust gas temperature (EGT) might be as follows:

$$EGT=0.1^*\text{power}+0.001^*\text{altitude}+0.01^*\text{temperature}+0.05^*\text{airspeed} \quad (3)$$

In this example, an engine that had power set to 100, altitude at 1000, temperature at 300, and air speed at 200, would result in a predicted EGT value of 24 degrees, but might have a measured EGT value of 14 degrees, which would indicate that the engine was 10 degrees below the predicted value.

The engine baseline modeling component 34 also comprises a metric component 44 that validates the engine baseline model. In particular, the metric component 44 validates the engine baseline model by examining the quality of the built model. In this disclosure, the metric component 44 determines the goodness of model fit by analyzing statistical "goodness of fit" metrics, such as R-squared, which is a common regression tool output. One of ordinary skill in the art will recognize that the metric component 44 can determine other metrics besides the R-squared metric such as the mean square error, sum square error and sigma metrics, which are other common regression tool outputs.

The engine baseline modeling component 34 also comprises a data cleaning heuristics component 46 that cleans the preprocessed data according to a set of heuristics. Generally, the data cleaning heuristics component 46 uses heuristics to remove data that does not conform to the norm. An illustrative, but non-exhaustive list of data that the data cleaning heuristics component 46 removes includes regression outliers, regression leverage points, and faulty engines. In this disclosure, this data cleaning operation can be performed for groups of engines or fleets of aircraft that use a common engine.

FIG. 2 also shows that the engine baseline modeling system 28 comprises a model diagnostics component 36 that evaluates the performance of the engine baseline model. In particular, the model diagnostics component 36 generates statistical outputs that provide statistical information to a user of the engine baseline modeling system 28. An illustrative, but non-exhaustive list of the statistical outputs that the model diagnostics component 36 generates includes variance, $r^2$, collinearity, probability plots, residual plots, standard error measurements, confidence limits on the engine baseline model, prediction limits, pure error lack-of-fit test, data sub-setting lack-of-fit test, multicolinearity metrics (variance inflation factors), autocorrelation of residuals (Durbin-Watson statistic), etc.

The algorithms performed by the components in the engine baseline modeling system 28 (i.e., the preprocessor 32, engine baseline modeling component 34 and model diagnostics component 36 can be programmed with a commercially available statistical package such as SAS, but other languages such as C or Java may be used.

The engine baseline modeling system 28 is not limited to a software implementation. For instance, the preprocessor 32, engine baseline modeling component 34 and model diagnostics component 36 may take the form of hardware or firmware or combinations of software, hardware, and firmware. In addition, the engine baseline modeling system 28 is not limited to the preprocessor 32, engine baseline modeling component 34 and model diagnostics component 36. One of ordinary skill in the art will recognize that the engine baseline modeling system 28 may have other components.

Figure 3:
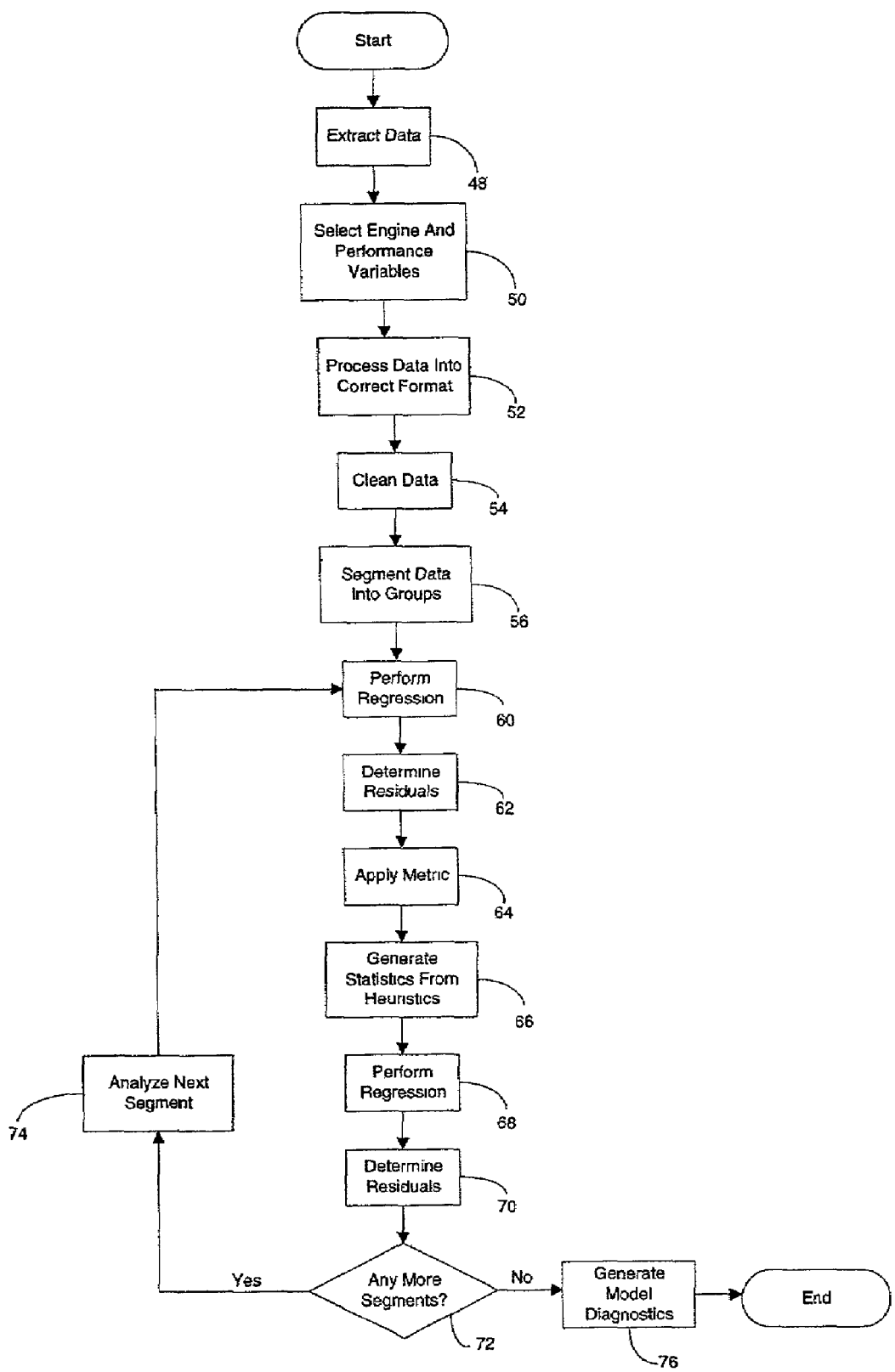
FIG. 3 shows a flow chart describing actions performed by the engine baseline modeling system shown in FIG. 2.

FIG. 3 shows a flow chart describing actions performed by the engine baseline modeling system 28 shown in FIG. 2. At block 48, the data acquisition component 38 extracts the engine data from the engine service database 30. Next, at 50 the user of the engine baseline modeling system 28 selects a particular engine model and engine performance variables for that engine that he or she would like to model (e.g., power setting, altitude, air speed and air temperature). The preprocessor 32 converts data into a standardized format at 52 and the data scrubbing component 40 cleans the engine data at 54. The data segmenting component 42 then segments the engine data into groups such as altitude, air speed and air temperature, fuel specific heat value, air humidity, control settings, etc. at 56.

After the data segmenting component 42 has segmented the engine data into groups, the engine baseline modeling component 34 builds an engine baseline model from the data processed by the preprocessor 32. In particular, the building of the engine baseline model begins with the engine baseline modeling component 34 performing a regression to determine parameters for each of the selected engine performance variables (e.g., altitude, air speed and air temperature) at 60. As mentioned above, the regression relates the engine performance variables as a function of engine operating conditions. The metric component 44 then determines the residuals of the regression at 62 and applies the metrics (e.g., R-square, mean square error, sum square error and sigma metrics) at 64. Next, the data cleaning heuristics component 46 cleans the preprocessed data according to a set of heuristics and generates certain statistics such as outliers and leverage points at 66.

The engine baseline modeling component 34 then performs another regression at 68. The engine baseline modeling component 34 applies a second regression to improve the parameter estimates by using a cleaner data set. Again, the metric component 44 determines additional residuals at 70. Alternatively, the metric component 44 can generate plots of the residual if a user desires. At 72, the engine baseline modeling component determines whether there are any more segments that have to be analyzed. If there are more segments, then the next segment is analyzed at 74 and blocks 60-72 are repeated. This process continues until it is determined at 72 that there are no more segments. Once it has been determined that there are no more segments, then the model diagnostics component 36 evaluates the performance of the of the engine baseline model at 76 and generates certain statistical outputs that relate to the model.

The foregoing flow chart of this disclosure shows the functionality and operation of the engine baseline modeling system 28. In this regard, each block represents a module, segment, or portion of code, which comprises one or more executable instructions for implementing the specified logical function(s). It should also be noted that in some alternative implementations, the functions noted in the blocks may occur out of the order noted in the figures or, for example, may in fact be executed substantially concurrently or in the reverse order, depending upon the functionality involved. Furthermore, the functions can be implemented in programming languages such as C and Java, however, other computer programming languages can be used. Also, the engine service database 30 may be constructed using commercial databases including standard relational, object oriented or hierarchical databases. Data manipulation operations, including retrieval, creation, modification, and deletion, can be implemented within the programming languages or within the database using stored procedures or triggers or combinations.

The above-described engine baseline modeling system 28 comprises an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Figure 4:
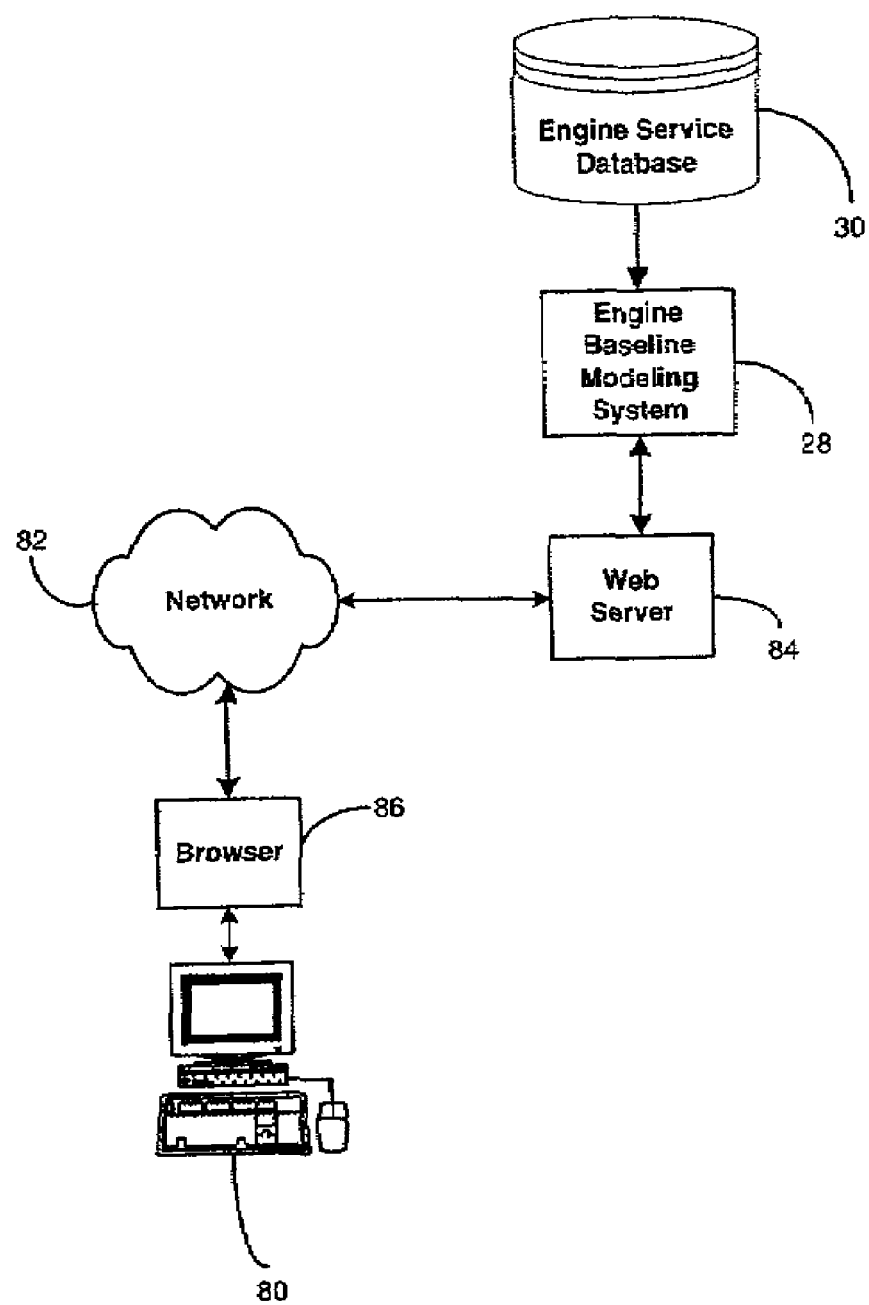
FIG. 4 shows an architectural diagram of a system for implementing the engine baseline modeling system shown in FIG. 2.

FIG. 4 shows an architectural diagram of a system 78 for implementing the engine baseline modeling system 28 shown in FIG. 2 in a networked environment. In FIG. 4, a user uses a computing unit 80 to access the engine baseline modeling system 28 and engine service database 30. More specifically, the computing unit 80 connects to the engine baseline modeling system 28 and engine service database 30 through a communication network 82 such as an electronic or wireless network. The computing unit 80 can take the form of a handheld digital computer, personal digital assistant computer, notebook computer, personal computer or workstation, while the communications network may be a private network such as an extranet or intranet or a global network such as a WAN (e.g., Internet). A web server 84 serves the engine baseline modeling system 28 and the engine service database 30 to the user in the form of web pages. The web pages can be in the form of HTML, however, other formats and structures can be used such as SGML, XML or XHTML. The user uses a web browser 86 running on the computing unit 80 such as Microsoft INTERNET EXPLORER, Netscape NAVIGATOR or Mosaic to locate and display the web pages generated from the engine baseline modeling system 28 and engine service database 30.

If desired, the system 78 may have functionality that enables authentication and access control of users accessing the web pages linked to the engine baseline modeling system 28. Both authentication and access control can be handled at the web server level by a commercially available package such as Netegrity SITEMINDER. Information to enable authentication and access control such as the user names, location, telephone number, organization, login identification, password, access privileges to certain resources, physical devices in the network, services available to physical devices, etc. can be retained in a database directory. The database directory can take the form of a lightweight directory access protocol (LDAP) database, however, other directory type databases with other types of schema may be used including relational databases, object-oriented databases, flat files, or other data management systems.

It is apparent that there has been provided in accordance with this invention, a baseline modeling system, method and computer product. While the invention has been particularly shown and described in conjunction with a preferred embodiment thereof, it will be appreciated that a person of ordinary skill in the art can effect variations and modifications without departing from the scope of the invention.

The invention claimed is:

1. A method for performing engine baseline modeling, comprising:
   storing engine data;
   preprocessing the engine data into a predetermined format, wherein the preprocessing comprises cleaning the engine data;
   building an engine baseline model for an engine from the preprocessed data, wherein the engine baseline model relates engine performance variables as a function of engine operating conditions; and
   evaluating the performance of the engine baseline model.

2. The method according to claim 1, wherein the preprocessing further comprises extracting the engine data from an engine service database.

3. The method according to claim 1, wherein the preprocessing further comprises segmenting the engine data into a plurality of groups.

4. The method according to claim 1, wherein the engine baseline model is a regression model.

5. The method according to claim 1, further comprising validating the engine baseline model.

6. The method according to claim 1, further comprising generating rules for cleaning the preprocessed data.

7. A method for performing engine baseline modeling, comprising:
   storing engine data;
   preprocessing the engine data into a predetermined format, wherein the preprocessing comprises cleaning the engine data;
   building an engine baseline model for an engine from the preprocessed data using a regression analysis, wherein the regression analysis relates engine performance variables as a function of engine operating conditions; and
   evaluating the performance of the engine baseline model.

8. The method according to claim 7, wherein the preprocessing further comprises extracting the engine data from an engine service database.

9. The method according to claim 7, wherein the preprocessing further comprises segmenting the engine data into a plurality of groups.

10. The method according to claim 7, further comprising validating the engine baseline model.

11. The method according to claim 7, further comprising generating rules for cleaning the preprocessed data.

12. A method for performing engine baseline modeling of an aircraft engine, comprising:
   storing aircraft engine data;
   preprocessing the aircraft engine data into a predetermined format, wherein the preprocessing corrects the aircraft engine data to standard conditions derived for an aircraft engine, and wherein the preprocessing comprises generating rules for cleaning the preprocessed data;
   building an engine baseline model for an engine from the preprocessed data using a regression analysis, wherein the regression analysis relates engine performance variables as a function of engine operating conditions; and
   evaluating the performance of the engine baseline model.

13. The method according to claim 12, further comprising validating the engine baseline model.

14. A method for performing engine baseline modeling of an aircraft engine, comprising:
   storing aircraft engine data;
   preprocessing the aircraft engine data into a predetermined format, wherein the preprocessing corrects the aircraft engine data to standard conditions derived for an aircraft engine, and wherein the preprocessing comprises generating rules for cleaning the preprocessed data;
   building an engine baseline model for an engine from the preprocessed data using a regression analysis, wherein the regression analysis relates engine performance variables as a function of engine operating conditions;
   validating the engine baseline model;
   generating model diagnostics from the engine baseline model; and
   evaluating the performance of the engine baseline model.

15. A method for performing engine baseline modeling of an engine, comprising:
   presenting a user with aircraft engine data;
   prompting the user to select engine performance variables and engine operating conditions from the aircraft engine data to model;
   in response to the user selection, preprocessing the engine data into a predetermined format, wherein the preprocessing comprises cleaning the engine data;
   using a regression to build an engine baseline model for an engine from the data; and
   evaluating the performance of the engine baseline model.

16. The method according to claim 15, further comprising validating the engine baseline model.

17. The method according to claim 15, further comprising generating rules for cleaning the preprocessed data.

18. The method according to claim 15, further comprising displaying results from the evaluation to the user.

19. A computer-readable medium readable by a computer system and storing computer instructions for execution by the computer system to perform engine baseline modeling, the computer instructions comprising:
   storing engine data;
   preprocessing the engine data into a predetermined format, wherein the preprocessing comprises cleaning the engine data;
   building an engine baseline model for an engine from the preprocessed data, wherein the engine baseline model relates engine performance variables as a function of engine operating conditions; and
   evaluating the performance of the engine baseline model.

20. The computer-readable medium according to claim 19, wherein the preprocessing further comprises extracting the engine data from an engine service database.

21. The computer-readable medium according to claim 19, wherein the preprocessing further comprises segmenting the engine data into a plurality of groups.

22. The computer-readable medium according to claim 19, wherein the engine baseline model is a regression model.

23. The computer-readable medium according to claim 19, further comprising instructions for validating the engine baseline model.

24. The computer-readable medium according to claim 19, further comprising instructions for generating rules for cleaning the preprocessed data.

25. A computer-readable medium readable by a computer system and storing computer instructions for execution by the computer system to perform engine baseline modeling, the computer instructions comprising:
storing engine data;
preprocessing the engine data into a predetermined format, wherein the preprocessing comprises cleaning the engine data;
building an engine baseline model for an engine from the preprocessed data using a regression analysis, wherein the regression analysis relates engine performance variables as a function of engine operating conditions; and
evaluating the performance of the engine baseline model.

26. The computer-readable medium according to claim 25, wherein the preprocessing further comprises extracting the engine data from an engine service database.

27. The computer-readable medium according to claim 25, wherein the preprocessing further comprises segmenting the engine data into a plurality of groups.

28. The computer-readable medium according to claim 25, further comprising instructions for validating the engine baseline model.

29. The computer-readable medium according to claim 25, further comprising instructions for generating rules for cleaning the preprocessed data.

30. A computer-readable medium readable by a computer system and storing computer instructions for execution by the computer system to perform engine baseline modeling, the computer instructions comprising:
storing aircraft engine data;
preprocessing the aircraft engine data into a predetermined format, wherein the preprocessing corrects the aircraft engine data to standard conditions derived for an aircraft engine, and wherein the preprocessing comprises generating rules for cleaning the preprocessed data;
building an engine baseline model for an engine from the preprocessed data using a regression analysis, wherein the regression analysis relates engine performance variables as a function of engine operating conditions; and
evaluating the performance of the engine baseline model.

31. The computer-readable medium according to claim 30, further comprising instructions for validating the engine baseline model.

32. A computer-readable medium readable by a computer system and storing computer instructions for execution by the computer system to perform engine baseline modeling, the computer instructions comprising:
storing aircraft engine data;
preprocessing the aircraft engine data into a predetermined format, wherein the preprocessing corrects the aircraft engine data to standard conditions derived for an aircraft engine, and wherein the preprocessing comprises cleaning the preprocessed data;
building an engine baseline model for an engine from the preprocessed data using a regression analysis, wherein the regression analysis relates engine performance variables as a function of engine operating conditions;
validating the engine baseline model;
generating model diagnostics from the engine baseline model; and
evaluating the performance of the engine baseline model.

33. A computer-readable medium readable by a computer system and storing computer instructions for execution by the computer system to perform engine baseline modeling, the computer instructions comprising:
presenting a user with aircraft engine data;
prompting the user to select engine performance variables and engine operating conditions from the aircraft engine data to model;
in response to the user selection, preprocessing the engine data into a predetermined format, wherein the preprocessing comprises cleaning the engine data;
using a regression to build an engine baseline model for an engine from the preprocessed data; and
evaluating the performance of the engine baseline model.

34. The computer-readable medium according to claim 33, further comprising instructions for validating the engine baseline model.

35. The computer-readable medium according to claim 33, further comprising instructions for generating rules for cleaning the preprocessed data.

36. The computer-readable medium according to claim 33, further comprising instructions for displaying results from the evaluation to the user.

37. A system for performing baseline modeling of a process, comprising:
a memory;
a processor in communication with the memory;
a service database that contains data relating to the process;
a preprocessor for processing the data into a predetermined format, wherein the preprocessor comprises a data scrubbing component that cleans the data; and
a baseline modeling component that builds a baseline model for an engine from the preprocessed data, wherein the baseline model relates process performance variables as a function of process operating conditions; and
a model diagnostics component that evaluates the performance of the baseline model.

38. The system according to claim 37, wherein the preprocessor further comprises a data acquisition component that extracts the data from the service database.

39. The system according to claim 37, wherein the preprocessor further comprises a data segmenting component that segments the data into a plurality of groups.

40. The system according to claim 37, wherein the baseline model is a regression model.

41. The system according to claim 37, wherein the baseline modeling component (34) comprises a metric component that validates the baseline model.

42. The system according to claim 37, wherein the baseline modeling component comprises a heuristics component that generates rules for cleaning the preprocessed data.

43. A method for performing baseline modeling of a process, comprising:
storing process data;
preprocessing the process data into a predetermined format, wherein the preprocessing comprises cleaning the process data;
building a baseline model for a process from the preprocessed data, wherein the baseline model relates process performance variables as a function of process operating conditions; and
evaluating the performance of the baseline model.

44. The method according to claim 43, wherein the preprocessing further comprises extracting the process data from a service database.

45. The method according to claim 43, wherein the preprocessing further comprises segmenting the process data into a plurality of groups.

46. The method according to claim 43, wherein the process baseline model is a regression model.

47. The method according to claim 43, further comprising validating the baseline model.

48. The method according to claim 43, further comprising generating rules for cleaning the preprocessed data.

49. A computer-readable medium readable by a computer system and storing computer instructions for execution by the computer system to perform baseline modeling of a process, the computer instructions comprising:

storing process data;

preprocessing the process data into a predetermined format, wherein the preprocessing comprises cleaning the process data;

building a baseline model for an engine from the preprocessed data, wherein the baseline model relates process performance variables as a function of process operating conditions; and evaluating the performance of the baseline model.

50. The computer-readable medium according to claim 49, wherein the preprocessing further comprises extracting the process data from a service database.

51. The computer-readable medium according to claim 49, wherein the preprocessing further comprises segmenting the process data into a plurality of groups.

52. The computer-readable medium according to claim 49, wherein the baseline model is a regression model.

53. The computer-readable medium according to claim 49, further comprising instructions for validating the baseline model.

54. The computer-readable medium according to claim 49, further comprising instructions for generating rules for cleaning the preprocessed data.

\* \* \* \* \*